United States Patent
Mori et al.

[11] Patent Number: 5,678,355
[45] Date of Patent: Oct. 21, 1997

[54] WEED INHIBITING ENCLOSURE MEMBERS FOR USE WITH CONTAINER GROWN PLANTS AND METHODS OF USE THEREOF

[76] Inventors: Leno Valentino Mori, R.R. #2; Robert Victor Mori, P.O. 1173, 166 Queen Street; James Edward Slominski, R.R. #2, all of Niagara-on-the-Lake Ontario, Canada, L0S 1J0; Uwe Sonneman, 109 Harcourt Crescent, Kitchener Ontario, Canada, N2P 1M1

[21] Appl. No.: 420,313
[22] Filed: Apr. 10, 1995
[51] Int. Cl.$^6$ .................................... A01G 9/02
[52] U.S. Cl. .................................... 47/84; 47/72
[58] Field of Search .................... 47/84 C, 72, 84 R; 206/423

[56] References Cited

U.S. PATENT DOCUMENTS

| | | | |
|---|---|---|---|
| 1,464,534 | 8/1923 | Lovett, Jr. | 47/72 |
| 3,052,063 | 9/1962 | Dunn | 47/72 |
| 3,556,389 | 1/1971 | Gregoire | 47/72 |
| 4,091,925 | 5/1978 | Griffo et al. | 47/72 |
| 4,621,733 | 11/1986 | Harris | 47/72 |
| 5,315,785 | 5/1994 | Avôt et al. | 47/72 |

FOREIGN PATENT DOCUMENTS

| | | | |
|---|---|---|---|
| 2477107 | 9/1981 | France | 47/72 |
| 2567068 | 1/1986 | France | 47/72 |
| 094005190 | 3/1994 | WIPO | 47/72 |

*Primary Examiner*—Terry Lee Melius
*Assistant Examiner*—Joanne C. Downs
*Attorney, Agent, or Firm*—McConnell and Fox

[57] ABSTRACT

A weed growth inhibiting enclosure member for use with container grown ornamental plants comprises a frusto-conical open-ended tube of thin, flexible light-impervious material of diameter to fit snugly around the container exterior, and of a length such that its upper part overlays the open container top and can be wrapped closely around the plant stem for retention without using a tie. This upper part has spaced perforations of size to permit passage of water to the earth in the container while preventing protrusion of weeds therethrough. The member reduces evaporation and also protects the container exterior against the adverse effects of sunlight and dirt. The weeds are thus denied the light essential to their growth, while access of the wanted plant is unimpeded, so that the weeds remain immature and compete only minimally for water and nutrients. The wrapping of the tube part around the plant stem ensures that it will not impede growth of the plant, as might a tie. Preferably the member is provided with a longitudinal tear line or lines facilitating its removal from the container for a single final weeding before the plants are shipped, as contrasted with the frequent multiple weedings previously required. The tube may be of polyethylene of thickness 1½–2½ mils, while the holes may be of 3–5 mm diameter, preferably of 4 mm diameter, spaced from one another from 2½ cm to 3½ cm, preferably 3 cm. The invention also comprises methods of growing plants in a growth medium in plant containers while inhibiting the growth of weeds in the medium by use of such enclosure members.

17 Claims, 2 Drawing Sheets

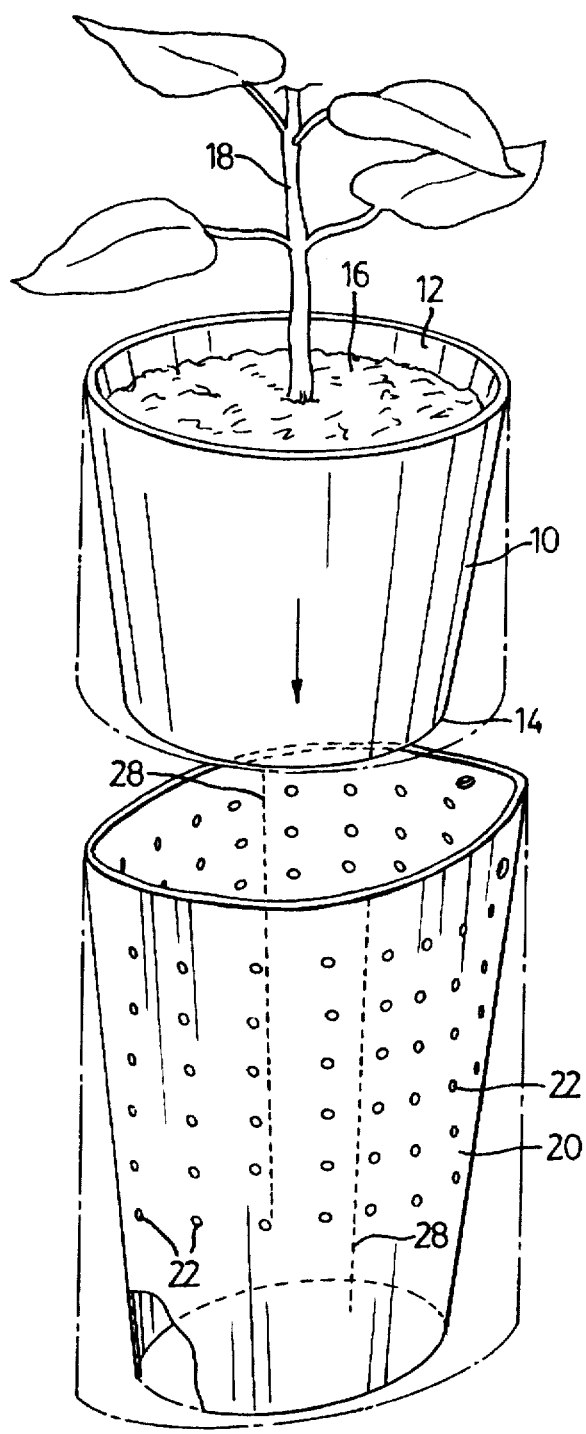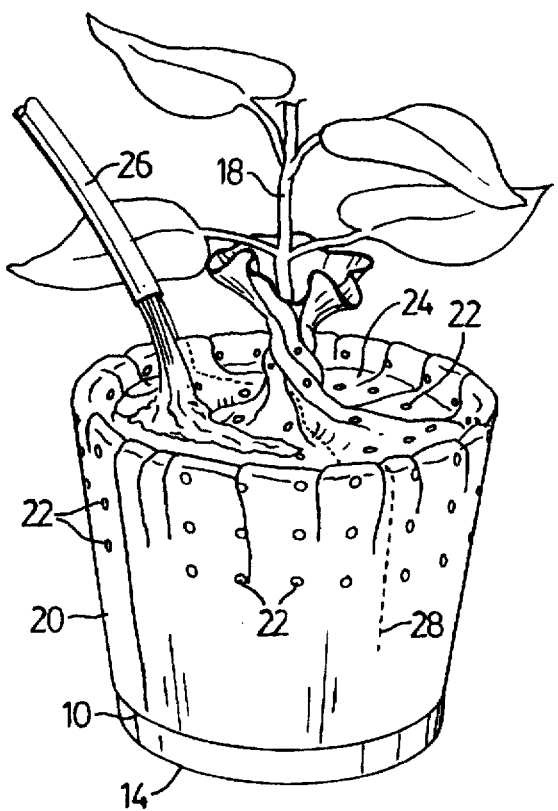
FIG. 1
FIG. 2

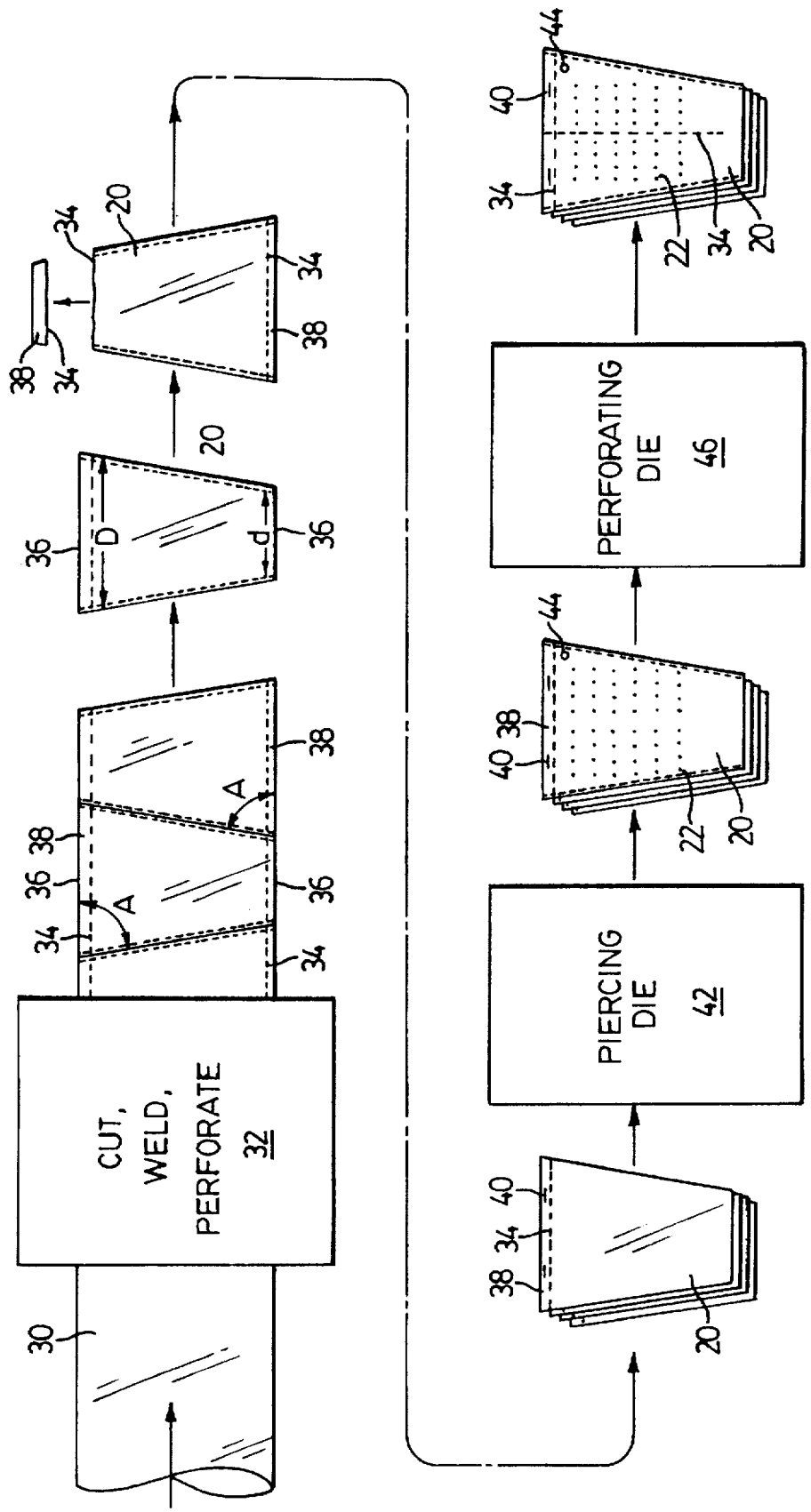

WEED INHIBITING ENCLOSURE MEMBERS FOR USE WITH CONTAINER GROWN PLANTS AND METHODS OF USE THEREOF

FIELD OF THE INVENTION

The present invention is concerned with new weed inhibiting enclosure members for use with container grown plants, and with new methods of using such enclosure members in combination with container grown plants.

REVIEW OF THE PROBLEM AND THE PRIOR ART

The propagation and growth of ornamental plants in containers of growth medium for subsequent sale as nursery stock is now an industry of very considerable size. The procedures employed are inherently labour intensive and one part which increases the labour content considerably results from the need to keep the containers as free as possible from weeds, both from the aspect of customer acceptance, and from the desire to ensure that the water supplied and nutrients in the growth medium are available only, or predominantly, to the ornamental plant. It is uneconomic to try to render natural plant growth media such as earth weed free, and most weeds are prolific and fast growing, as compared to the desired ornamental plants. Chemical herbicides are expensive, and their use usually is inappropriate in containers with newly emerging and therefore relatively delicate plants. Moreover, in some jurisdictions, as a result of concern for the environment, where herbicides are used it is a requirement that water from the plant growing facility be collected and purified before it can be discharged. The solution hitherto to these concerns is for the containers to be weeded manually at frequent intervals, often as short as only a few days, over the much longer periods required for the propagation of most ornamental plants to a commercially acceptable state of maturity. It has been an endeavour in the industry therefore to find inexpensive, non-chemical methods, and/or devices, that are environmentally friendly, that require a minimum of labour, and that will inhibit weed growth as much as possible, preferably completely, without hindering growth of the ornamental plants.

It has been proposed hitherto to provide various wrappings for potted plants to facilitate their handling and/or shipment and, for example, U.S. Pat. No. 4,413,725 discloses such a package comprising a decorative sheet that is held in place around the pot by a flexible tubular sleeve of transparent plastics material that snugly encircles the sheet.

DEFINITION OF THE INVENTION

The principal object of the invention is to provide new weed growth inhibiting enclosure members for use with container grown plants that will inhibit growth of weeds in the container while minimizing any hindrance to the growth of the ornamental potted plant.

It is another object to provide such new weed growth inhibiting enclosure members that will serve to protect the containers from exposure to weathering until they are ready to be delivered to the prospective customer.

It is a further object to provide such new weed growth inhibiting enclosure members that will also assist in reducing evaporation from the growth medium within the containers, thereby conserving water and reducing the need for frequent watering.

It is a further object to provide such new weed growth inhibiting enclosure members that can be made of biodegradable materials for environmentally friendly disposal when they have served their purpose.

It is another principal object to provide new methods of growing container grown ornamental plants that will inhibit the growth of weeds while minimizing any hindrance to the growth of the ornamental plant.

In accordance with the present invention there is provided a weed growth inhibiting enclosure member for use with a plant growth container having a bottom end on which it stands and an open top end, the container containing plant growth medium and at least one growing plant with a stem extending above the container top end;

the enclosure member comprising a tube of thin, flexible light-impervious sheet plastics material having lower, middle and upper portions, the member being of such transverse dimension for the lower portion to fit snugly around the exterior of the container, and of a length such that with the container fitted within the enclosure member the middle and upper portions can extend above the container top end;

the length of the middle portion being sufficient to permit it to extend inward toward the plant stem and to overlie the growth medium and thereby inhibit access of light thereto and growth of weeds therein, and the length of the upper portion being sufficient to permit it to be wrapped around the plant stem; and at least the middle portion having therein spaced holes of 3-5 mm effective diameter, such holes being of size and spacing to permit sufficient passage of water to the growth medium while inhibiting protrusion of weeds therethrough.

Also in accordance with the invention there is provided a method of growing a plant in a growth medium in a plant container while inhibiting the growth of weeds in the medium, the container having a bottom end on which it stands and an open top end, and containing in the plant growth medium at least one growing plant with a stem extending above the container open top end;

the method including the steps of fitting the container into an enclosure member comprising a tube of thin, flexible light-impervious sheet plastics material having lower, middle and upper portions, the member being of such transverse dimension for the lower portion to fit snugly around the exterior of the container, and of a length such that with the container so fitted within the enclosure member the middle and upper portions extend above the container top end, at least the middle portion having therein spaced holes of 3-5 mm effective diameter, such holes being of size and spacing to permit passage of sufficient water to the growth medium while inhibiting protrusion of weeds therethrough;

gathering the enclosure member upper portion closely around the plant stem so that the middle portion overlies the growth medium to inhibit access of light thereto, and wrapping the upper portion helically around the plant stem so that it will remain thus wrapped around the plant stem; and thereafter supplying water to the growth medium through the holes.

Further in accordance with the invention there is provided a weed growth inhibiting enclosure member for use with a plant container having a bottom end on which it stands and an open top end, the container containing plant growth medium and at least one growing plant with a stem extending above the container top end;

the enclosure member comprising a tube of thin, flexible light-impervious sheet plastics material having lower, middle and upper portions, the member being of such transverse dimension for the lower portion to fit snugly around the exterior of the container, and of a length such that with the container fitted within the enclosure member the middle and upper portions can extend above the container top end;

the length of the middle portion being sufficient to permit it to extend inwards toward the plant stem and to overlie the growth medium and thereby inhibit access of light thereto and growth of weeds therein;

the length of the upper portion being sufficient to permit it to be gathered closely around the plant stem and wrapped helically around the plant stem to an extent such that it will remain wrapped around the plant stem; and at least the enclosure member middle portion having therein holes of size and spacing to permit sufficient passage of water to the growth medium while inhibiting protrusion of weeds therethrough and growth of weeds in the growth medium.

The enclosure member may be provided with a longitudinal tear line between its ends facilitating its removal from the container, or it may be provided with a pair of oppositely opposed longitudinal tear lines facilitating tearing along the lines into two separate parts for removal from the container.

When the container is tapered to be of truncated pyramidal shape, the enclosure member is also of the same taper and is open at both ends, the smaller transverse dimension corresponding to that of the container intermediate its ends so that the container will fit snugly within the tube lower portion with the lower end intermediate the container ends.

The part of the member upper middle portion may be depressed into the growth medium to form an annular depression for collection of water until it can drain through the perforations holes into the growth medium.

The tube may be of sheet polyethylene material of thickness 1½–2½ mils, and preferably has holes of 4 mm effective diameter. Such holes may be spaced at a distance from one another of between 2½ cm and 3½ cm, preferably 3 cm.

DESCRIPTION OF THE DRAWINGS

Weed growth inhibiting enclosure members, methods of making such members, and methods of growing container grown plants that are particular preferred embodiments of the invention will now be described, by way of example, with reference to the accompanying diagrammatic drawings wherein:

FIG. 1 is an exploded perspective view, from above and to one side, showing a tapered container and a correspondingly tapered enclosure with the container positioned above the member for insertion therein;

FIG. 2 is a similar perspective view showing the container within the enclosure member with portion of the member extending above the container upper edge wrapped about the stem of the ornamental plant; and FIG. 3 is a block flow diagram showing a method of manufacturing a tapered enclosure member from thin sheet plastics material.

DESCRIPTION OF THE PREFERRED EMBODIMENTS

Referring now to FIGS. 1 and 2, the type of plant container 10 most commonly used in the industry is molded from ceramic or plastics material, increasingly recently of plastics material, to be of frusto-conical shape, relatively pronouncedly tapered inwards from top to bottom, as shown in FIG. 1 in solid lines, with a top edge 12 of larger diameter and a bottom edge 14 of smaller diameter. It is also known to use molded containers of more uniform diameter, as indicated in broken lines in FIG. 1, in which the top and bottom edges are of almost the same diameter; all such commercially produced molded containers will however have a small taper of about one or two degrees to permit their ready release from the mold in which they are formed. Each container is filled with growth medium 16, usually a good quality potting soil, and contains an ornamental plant 18 with its stem protruding above the upper edge of the container. The containers used commercially are of relatively standard dimensions, so that it is economical to produce the enclosure members in quantity to fit a particular size container.

Enclosure members 20 for use with the containers are open at both ends and are also of frusto-conical shape of the same taper, the containers being inserted into the open upper larger ends of the members and pushed down therein as far as possible, namely until the smaller lower end portion of the member fits snugly around the container somewhere between its ends and it has middle and upper portions that extend above the container upper edge. The upper end portion of the member is grasped by hand by the operator, gathered in toward the plant stem and then twisted to wrap it helically around the plant stem, for example to the configuration shown in FIG. 2, in which the middle portion extends generally horizontally over the upper surface of the growth medium. The length of this upper portion and the physical characteristics of the material being are such that once so wrapped the enclosure member will remain in place, without the need of a restraint such as an elastic band or wire tie. The member therefore does not apply any restraint to increase in diameter of the plant stem that might otherwise inhibit its growth and/or mar its appearance. At least this upper the middle portion of the member is provided with a plurality of uniformly distributed holes 22 of a size that will readily permit the passage of water to the growth medium, but will inhibit the protrusion of weeds therethrough. The holes also permit the ready venting to the outer atmosphere of any gases issuing from the growing medium. The preferred size and distribution of these holes will be discussed in more detail below.

The generally horizontally extending middle portion is in addition pushed downward into the growth medium to facilitate the retention of the enclosure member in its wrapped configuration, and also to provide a shallow annular depression 24 which will retain irrigation water supplied from a spray nozzle 26 until the water can drain through the holes 22 to the growth medium; the nozzle may be manually or automatically operated.

The choice of the size of the holes 22 is found in practice to be important, since if they are too small they are found to prevent sufficiently free passage of the irrigation water to the growth medium. On the other hand weeds are naturally extremely aggressive in their growth and will take advantage of holes that are too large and/or too close together to grow vigorously through them, almost as though the enclosure members were not present; once a weed has been able to protrude through a watering hole it will be able to grow relatively unhindered. It has been determined that preferably the holes should be of size in the range 3–5 mm diameter, or equivalent diameter, and more particularly of 4 mm diameter, or equivalent diameter. By equivalent diameter is meant that when the holes are non-circular their area should be equal to that of a circle of the equivalent diameter. For convenience in language, in the claims this diameter is referred to as the effective diameter. The punches employed to make the holes should be of the type that removes a small portion of the material, and do not simply perforate the material, since the preferred materials have a substantial "memory" and perforated holes may subsequently close to be too small. It has also been determined that for optimum performance the holes should be spaced at a distance from one another in the range of from 2½ cm to 3½ cm, preferably 3 cm.

The members are provided with longitudinal tear perforation lines 28 that subsequently will allow the members to be torn easily into two separate portions for removal from the containers at the conclusion of a growing operation, i.e. just before they are re-potted or are dispatched to the customers. A minimum of a single longitudinal tear perforation line is required, but it is usually simpler and more economical to provide each member, or a stack of members, in a single operation with a pair of oppositely disposed such lines. The line or lines should terminate short of the lower edge of the members to ensure that tearing is not started prematurely during handling of the containers.

The location of the bottom edge of the enclosure member on the container preferably is not higher than about midway along its length. There is a considerable advantage in making the member of length such that its bottom edge is quite close to the container bottom edge, in that the member then also protects the container exterior against dirt and the adverse effects of weathering until the member is removed. Thus, currently a majority of plant containers are black, but increasingly they are produced in a range of bright colours (e.g. pink, red, green) which fade quickly in sunlight, and which are more readily adversely affected by the ultra-violet component in sunlight, breaking down the plastic and rendering it brittle. Surface dirt which almost inevitably collects on the exterior of the containers is also more noticeable with these bright colours, and this collects instead on the enclosure members and is stripped away when the members are removed.

The thin, flexible material of the enclosure member is one that is sufficiently opaque for little or no light to penetrate it to reach any weeds in the growth medium that may have germinated to the stage that a weed stalk is protruding above the surface of the medium. In the absence of adequate light, even though plenty of water and nutrients are present, any plants underneath the member will experience little or no growth, and will therefore remain relatively immature and of such small size that they will not compete with the ornamental plant of for any substantial amounts of the water and nutrients present. Moreover, they are easily removed in a single operation when the enclosure members are stripped from the containers just prior to re-potting or shipping. The leaf portion of the plant 18 required for photosynthesis and growth is completely clear of the enclosure member and the entire plant has unhindered access to the ambient light, water and soil nutrients, so that it no longer has to compete with any weeds that are present, except to a very minor extent.

The enclosure members of the invention thus provide a non-chemical device and method of propagation of container grown plants that will successfully inhibit the growth of unwanted weeds, while permitting normal growth of the desired ornamental plant. Moreover, the material of the members is relatively easily biodegradable and/or recyclable once they have been removed. A further advantage is that the enclosure member reduces considerably evaporation of water from the growth medium, so that less water is required and the periods between waterings can be extended. It is also found that the soil in the containers remains cooler, which is preferred by many of the container grown ornamentals.

Inexpensive plastics material of the required degree of opacity are readily available, the most common being the various linear low density polyethylenes (LLDPE) that are used for the production of garbage bags, many of which contain a proportion of recycled material. It is common with such materials to include a substantial amount of a dark colouring material, such as carbon black or dark pigments, in order to hide the inconsistent colour that otherwise would be obtained, and many of such materials currently available are already sufficiently opaque for the purpose of the invention. Such materials of thickness in the range 1½–2½ mils, preferably 2 mils are found to be satisfactory.

In a range of enclosure members for standard size containers, as used in commercial horticulture, the members are of length from 20 cm to 40 cm (20 ins to 16 ins). When flattened the members are of frusto-triangular shape, and members of this range of lengths will measure in the range 20 cm to 40 cm (20 ins to 16 ins) along the maximum dimension D (see FIG. 3), and in the range 13 cm to 21 cm (5.2 ins to 20.4 ins) along the minimum dimension d. Again, with members intended for the standard commercial tapered containers the angle A (see FIG. 3) will be about 80 degrees, while for the nominally straight-sided containers indicated in broken lines in FIG. 1 the angle will be a degree or two smaller than a right angle.

Referring now to FIG. 3, which is a flow chart illustrating diagrammatically an assembly line for the production of more highly tapered enclosure members 10 for the correspondingly tapered container of FIG. 1, the members preferably are manufactured from a blown extruded thin-walled tube 30 of a suitable opaque plastics material, such as an LLDPE material, that is passed from a roll thereof (not shown) in flattened condition, namely in the form of two overlying plies touching one another, longitudinally through a perforating, cutting and welding station 32. In the station the flat tube is provided with two transversely spaced longitudinal lines of through perforations 34 disposed parallel and close to its respective parallel edge folds 36. The perforations are sufficient for the respective border portions 38 between the edge folds and the perforations to be torn away easily when required, so that the resulting enclosure members will be open-ended at both the top and bottom ends. Also in this station the tube 30 is cut transversely across its full width by two longitudinally spaced transversely extending heated cutting knives (not shown) into the separate frusto-triangular shape pieces constituting the enclosure members. The knives are inclined at equal angles A corresponding to the taper angle of the walls of the container and therefore of the members; as these knives cut the tube they simultaneously heat weld together the adjacent edges of the two overlying plies, as indicated by the respective broken line parallel to the cut edge. The emerging tube is separated into the individual enclosure members, having their longitudinal dimension corresponding to the tube transverse dimension. The directions of taper of the members are reversed alternately for maximum utilisation of the plastics material.

Inexpensive sheet plastics materials of the suitably very small wall thicknesses are almost universally produced by extruding a smaller diameter tube of larger wall thickness, and then supplying pressurised air to the tube interior to increase its diameter and reduce its wall thickness to the required value. It may be found however with some of the smaller size enclosure members that a tube of small enough diameter is not commercially available, in which case they can be produced from two single plies of the material laid face to face, or alternatively two or more rows of enclosure members can be formed side by side from the same tube.

The separated enclosure members are stacked in piles or "flitches" of any suitable number, for example in piles of 50 for convenience in counting, all with their taper in the same direction; at about this time the shorter border portions along the shorter transverse edges may be stripped off and discarded. The members of the pile are held together for convenience in handling by fasteners, such as staples 40, passing through the remaining superimposed longer border portions, and the piles are then passed through a station 42 containing a hollow piercing punch and die (not shown) which pierces the holes 22 therein, removing the unwanted material to accurately determine the size of the holes, the size and distribution of which were described above. The punch and die also form a hole 44 through the stack, near to one corner of the members, which can receive a pin or hook (not shown) that is used to hold the stack conveniently at the locations where they are fitted onto the containers, for example on a belt worn by the operator. The stacks are then passed through a final station 46, in which they are provided with the longitudinal tear perforation lines 28; the tear lines terminate sufficiently far from the members lower edges that tearing should not occur prematurely during normal handling of the members and containers. Alternatively the perforation lines 28 could be provided at any other of the stations during the initial cutting or perforation of the members. If marking or printing of any kind is required on the members then this is best provided at an early stage of the production process, such as prior to entry into the station 32, or immediately after leaving that station.

A marking of contrasting color, such as a white dot, may may be applied at this stage to indicate the end of the tear line 28 for the convenience of the operator.

We claim:

1. A weed growth inhibiting enclosure member for use with a plant container having a bottom end on which the plant container stands and an open top end, the container containing plant growth medium and at least one growing plant with a stem extending above the container open top end;

the enclosure member comprising a tube of thin, flexible light-impervious sheet plastics material having upper and lower ends and having lower, middle and upper portions, the member being of such transverse dimension for the lower portion to fit snugly around the exterior of the container, and of a length such that with the container fitted within the enclosure member the middle and upper portions can extend above the container open top end;

the length of the middle portion being sufficient to permit the middle portion to extend inward toward the plant stem and to overlie the growth medium and thereby inhibit access of light thereto and growth of weeds therein, and the length of the upper portion being sufficient to permit the upper portion to be wrapped around the plant stem; and at least the middle portion having therein spaced punched out holes of 3–5 mm effective diameter spaced at a distance from one another of from 2½ cm to 3½ cm, such holes being of size and spacing to permit sufficient passage of water to the growth medium while inhibiting protrusion of weeds therethrough.

2. An enclosure member as claimed in claim 1, wherein the enclosure member is provided with a longitudinal tear line between the enclosure member ends facilitating tearing along the line for removal of the enclosure member from the container.

3. An enclosure member as claimed in claim 2, wherein the enclosure member is provided with a pair of oppositely opposed longitudinal tear lines between the enclosure member ends facilitating tearing of the enclosure member along the lines into two separate parts for removal of the enclosure member from the container.

4. An enclosure member as claimed in claim 1, and for use with a plant container of truncated pyramidal shape;

wherein the enclosure member is of truncated pyramidal shape with upper and lower open ends, the enclosure member having a smaller transverse dimension at the lower open end and a larger transverse dimension at the upper open end, the smaller transverse dimension corresponding to that of the container intermediate the container ends so that such a container will fit snugly within the lower portion with the enclosure member lower open end intermediate the container ends.

5. An enclosure member as claimed in claim 1, wherein the enclosure member is of polyethylene material of thickness 1½–2½ mils.

6. An enclosure member as claimed in claim 1, wherein the holes are punched out of the sheet plastics material to be of 4 mm effective diameter.

7. An enclosure member as claimed in claim 1, wherein the middle portion of the enclosure member is of sufficient length for the middle portion to be depressed into the growth medium to form an annular depression for collection of water until the water can drain through the holes into the growth medium.

8. An enclosure member as claimed in claim 1, and for use with a plant container of truncated pyramidal shape;

wherein the enclosure member is of truncated pyramidal shape with upper and lower open ends, the enclosure member having a smaller transverse dimension at the lower open end and a larger transverse dimension at the upper open end, the smaller transverse dimension corresponding to that of the container intermediate the container ends so that such a container will fit snugly within the enclosure member with the enclosure member lower open end intermediate the container ends.

9. A method of growing a plant in a growth medium in a plant container while inhibiting the growth of weeds in the growth medium, the container having a bottom end on which the container stands and an open top end, and containing in the plant growth medium at least one growing plant with a stem extending above the container open top end;

the method including the steps of fitting the container into an enclosure member comprising a tube of thin, flexible light-impervious sheet plastics material having upper and lower ends and having lower, middle and upper portions, the member being of such transverse dimension for the lower portion to fit snugly around the exterior of the container, and of a length such that with the container so fitted within the enclosure member the middle and upper portions extend above the container open top end, at least the middle portion having therein spaced punched out holes of 3–5 mm effective diameter spaced at a distance from one another of from 2½ cm to 3½ cm, such holes being of size and spacing to permit passage of sufficient water to the growth medium while inhibiting protrusion of weeds therethrough;

gathering the enclosure member upper portion closely around the plant stem so that the middle portion overlies the growth medium to inhibit access of light thereto, and wrapping the upper portion helically around the plant stem so that the upper portion will remain thus wrapped around the plant stem; and thereafter supplying water to the growth medium through the holes.

10. A method as claimed in claim 9, wherein the middle portion of the enclosure member is depressed into the growth medium to form an annular depression for collection of water until the water can drain through the holes into the growth medium, and including the step of feeding water into the annular depression.

11. A method as claimed in claim 9, wherein the enclosure member is provided with a longitudinal tear line between the enclosure member ends facilitating removal of the enclosure member from the container by tearing along the line, and including the step of tearing the enclosure member along the tear line and removing the enclosure member from the container.

12. A method as claimed in claim 9, wherein the enclosure member is provided with a pair of oppositely opposed longitudinal tear lines between the enclosure member ends facilitating tearing of the enclosure member along the lines into two separate parts for removal from the container, and including the step of tearing the enclosure member along the tear lines and removing the enclosure member from the container.

13. A method as claimed in claim 9, wherein the plant container with which the enclosure member is to be used is of truncated pyramidal shape, and the enclosure member is also of truncated pyramidal shape with upper and lower open ends, the enclosure member having a smaller transverse dimension at the lower open end and a larger transverse dimension at the upper open end, the smaller transverse dimension corresponding to that of the container intermediate the container ends, and including the step of fitting the container snugly within the enclosure member lower portion with the enclosure member lower open end intermediate the container ends.

14. A weed growth inhibiting enclosure member for use with a plant container having a bottom end on which the container stands and an open top end, the container containing plant growth medium and at least one growing plant with a stem extending above the container open top end;

the enclosure member comprising a tube of thin, flexible light-impervious sheet plastics material having upper and lower ends and lower, middle and upper portions, the member being of such transverse dimension for the lower portion to fit snugly around the exterior of the container, and of a length such that with the container fitted within the enclosure member the middle and upper portions can extend above the containers open top end;

the length of the middle portion being sufficient to permit the middle portion to extend inwards toward the plant stem and to overlie the growth medium and thereby inhibit access of light thereto and growth of weeds therein;

the length of the upper portion being sufficient to permit the upper portion to be gathered closely around the plant stem and wrapped helically around the plant stem to an extent such that the upper portion will remain wrapped around the plant stem; and at least the enclosure member middle portion having therein punched out holes of 3–5 mm effective diameter spaced at a distance from one another of from 2½ cm to 3½ cm, such holes being of size and spacing to permit sufficient passage of water to the growth medium while inhibiting protrusion of weeds therethrough and growth of weeds in the growth medium.

15. An enclosure member as claimed in claim 14, wherein the middle portion of the enclosure member is of sufficient length for the middle portion to be depressed into the growth medium to form an annular depression for collection of water until the water can drain through the perforations into the growth medium.

16. An enclosure member as claimed in claim 14, wherein the enclosure member is provided with a pair of oppositely opposed longitudinal tear lines between the enclosure member ends facilitating tearing of the enclosure member along the lines into two separate parts for removal of the enclosure member from the container.

17. An enclosure member as claimed in claim 14, wherein the enclosure member is of polyethylene material of thickness 1½–2½ mils.

* * * * *